Oct. 14, 1969  C. L. CASE  3,472,003
TENSION ASSEMBLY FOR CROP CONDITIONER
Filed Jan. 11, 1967
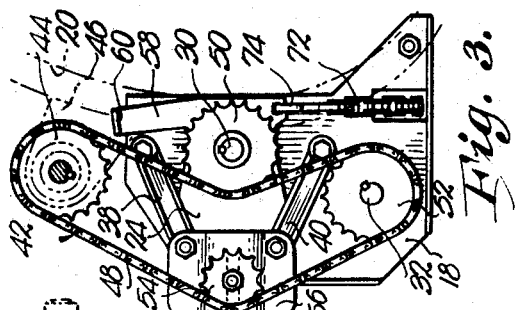
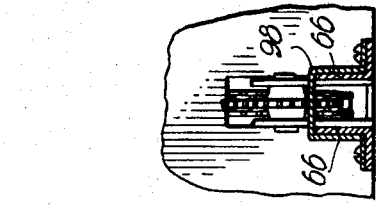
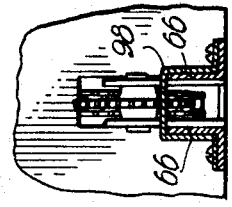
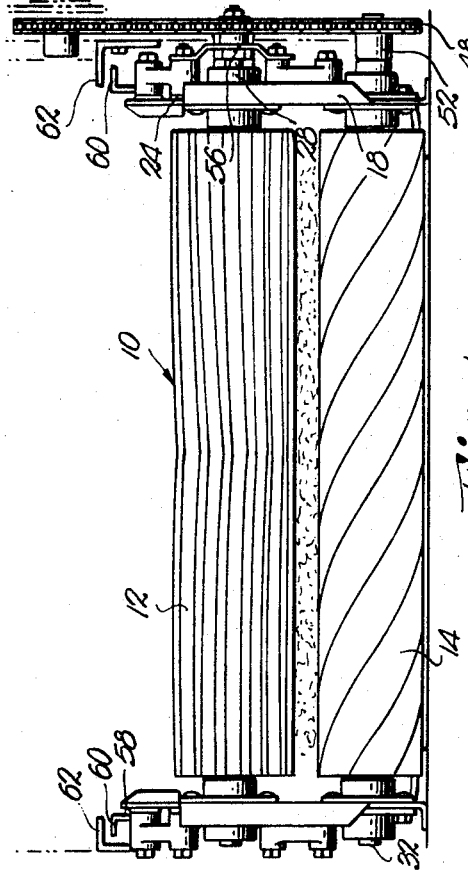
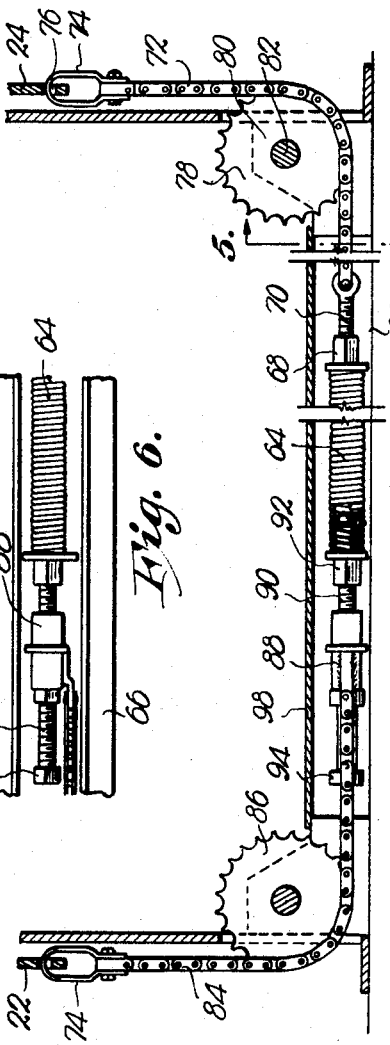
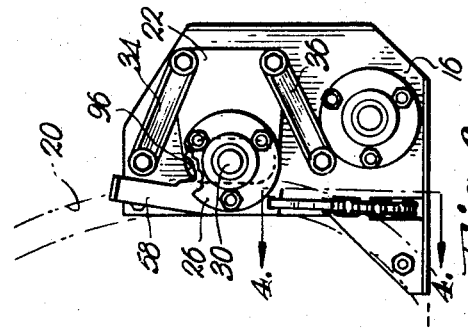
INVENTOR
*Cecil L. Case*
BY
*Hovey, Schmidt, Johnson & Hovey*
ATTORNEYS

# United States Patent Office 3,472,003
Patented Oct. 14, 1969

3,472,003
TENSION ASSEMBLY FOR CROP CONDITIONER
Cecil L. Case, Newton, Kans., assignor to Hesston Corporation, Inc., Hesston, Kans., a corporation of Kansas
Filed Jan. 11, 1967, Ser. No. 608,638
Int. Cl. A01d 49/00
U.S. Cl. 56—1                                           7 Claims

ABSTRACT OF THE DISCLOSURE

A crop conditioner having a roll rotatable on a fixed axis and a second roll having ends mounted for rotation in plates which are shiftably mounted through four-point suspension by pairs of arms pivotally coupled to a frame member and to a respective plate. A pair of chains extend from the plates and are fastened to opposite ends of a spring disposed beneath the rolls to bias the upper shiftable roll toward the roll rotatable on a fixed axis.

---

This invention relates to implements for treating freshly cut crops and, more particularly, to crop conditioners for crushing or otherwise fracturing the stems of the crop to augment drying by permitting escape of fluids from the crushed stems.

The use of crop conditioners for this purpose is well known and has proved to be highly successful in achieving highly palatable and nutritious feed for livestock with a minimum of loss in quality and content of the crop during the harvesting operation. Important to successful operation of conditioners of this type, however, has been the mounting of the conditioner rolls so that one roll may shift toward or away from the other roll to accommodate for variations in the quantity of flow of crop material between the rolls. It is equally important that the force exerted upon the crop be relatively uniform at all times despite the relative spacing between the rolls so that all of the stems of the crop will receive substantially uniform treatment. Further, the biasing force between the rolls should remain unaffected by lack of uniformity in the flow of the crop as may occur when relatively large bunches of the crop may flow between the rolls in closer proximity to one end of the rolls than the other.

The relative shifting movement which must be provided between the rolls to achieve uniform crop treatment presents problems of maintaining the roll drive chains taut throughout the extent of movement between the rolls. Further, the rolls should shift toward and away from one another along a substantially rectilinear path, not only for purposes of maintaining uniform tension in the drive chain, but also to achieve relatively uniform force to be exerted on the crop pasing through the conditioner regardless of the quantity of flow.

Efforts have heretofore been made to permit such roll shifting movement by mounting one of the rolls on relatively long arms with each end of the shiftable roll being independently biased by its own separate spring for urging each end of the roll toward the roll mounted for rotation on a fixed axis. This has created problems of available space on the machine to permit arms of sufficient length wherein the arcs of swing even approximate relatively straight, rectilinear motion. Nevertheless, problems of excessive friction have prevented use of slotted guides or trackways and have dictated that an arrangement of pivotally coupled linkage or arms be utilized for shiftably mounting the movable roll. Further, the use of independent springs for individually biasing each end of the shiftable roll allows the roll to shift away from the other roll throughout its entire length under the influence of a particualrly heavy feed of material proximal one end of the rolls, thereby causing inadequate crushing of the smaller flow between the rolls adjacent the other end.

Accordingly, it is the primary object of this invention to provide a novel mounting assembly which permits relative shifting movement between the juxtaposed rolls along a substantially rectilinear path of travel, yet requiring a minimum of space and preserving the low friction characteristics of pivoted linkage coupling.

It is another important object of this invention to provide novel means for biasing the shiftable roll toward the other roll and yet to maintain substantially uniform pressure between the rolls despite lack of uniformity in the flow of crop between the rolls.

These and other important objects will be further explained or will become apparent from the specification, claims and drawing.

In the drawing:

FIGURE 1 is a front elevational view of a crop conditioner embodying the principles of this invention;

FIG. 2 is an elevational view thereof, parts being broken away to reveal details of construction;

FIG. 3 is an end elevational view thereof showing the end opposite that appearing in FIG. 2;

FIG. 4 is an enlarged, fragmentary, cross-sectional view taken along line 4—4 of FIG. 2;

FIG. 5 is a cross-sectional view taken along line 5—5 of FIG. 4; and

FIG. 6 is a fragmentary, top elevational view of the tension spring and adjusting means, the top cover being removed to reveal details of construction.

The crop conditioner embodying the principles of this invention is broadly designated 10 and comprises a pair of elongated, juxtaposed rolls 12 and 14 disposed rearwardly of the cutter mechanism (not shown) of a harvesting implement. The operation of a crop conditioner for squeezing, crushing, or otherwise fracturing the fibrous stems of a freshly cut crop is well known to those skilled in the art and need not be further explained herein. Reference may be had to U.S. Letters Patent No. 3,085,384 and No. 3,241,300 which are incorporated herein by reference for a more complete explanation of the integration and operation of a conditioner of the type herein contemplated in a crop harvesting implement.

The lower conditioning roll 14 is mounted for rotation about a fixed axis between a pair of plate-like frame members 16 and 18. Members 16 and 18, in turn, are rigidly mounted to the harvesting implement frame 20 illustrated fragmentarily by broken lines in FIGS. 2 and 3. The curvilinear frame 20 may comprise an integral part of the header of the harvesting implement. Upper roll 12 is mounted on frame members 16 and 18 by a mounting assembly comprising rigid, irregularly shaped plates 22 and 24 to which are affixed bearings 26 and 28 carried by plates 22 and 24, respectively. Bearings 26 and 28 may be of the universal type to permit rotation of roll 12 even though the shaft 30 thereof may not be in precise parallel alignment with the corresponding shaft 32 of lower roll 14 as will be hereinafter explained.

Upper and lower rigid links 34 and 36 are pivotally coupled adjacent one of their ends to plate 22 and at the other ends to frame member 16 as illustrated in FIG. 2. It should be noted that links 34 and 36 are thereby angularly disposed with respect to one another in converging relationship as one end of each of the links 34 and 36 is approached, the other ends of the links lying in a common vertical plane with shaft 30 of upper roll 12. Shaft 30 is located between the points of pivotal coupling of links 34 and 36 to frame member 16.

Referring now to FIG. 3, it may be seen that plate 24 is similarly coupled to its corresponding frame member 18 by links 38 and 40. The converging relationship of links 38 and 40 is identical to that of links 34 and 36, the outer ends of links 38 and 40 being pivotally coupled to plate 24, while the other ends of the links are pivotally coupled to frame member 18 in a common vertical plane with shaft 30. The latter is disposed between the points of pivotal coupling of links 38 and 40 to frame member 18.

A chain drive 42 imparts rotational movement to rolls 12 and 14 and includes a drive sprocket 44 rotatably mounted on a bracket 46 illustrated by broken lines in FIG. 3. Bracket 46 may be rigidly mounted on frame 20. A drive chain 48 is trained around drive sprocket 44, sprockets 50 and 52 mounted on shafts 30 and 32 respectively, and around an idler sprocket 54 carried by a plate-like bracket 56 which is bolted to links 38 and 40.

Each plate 22 and 24 has an integral arm 58 extending upwardly therefrom. The arms 58 terminate in an outturned flange 60 which cooperates with an inturned frame member 62 to provide a limiting stop to define the upper extremity of movement of plates 22 and 24 when roll 12 is shifted away from roll 14 by the passage of crop material between the rolls.

Means for biasing upper roll 12 downwardly toward lower roll 14 includes a spring 64 disposed longitudinally of rolls 12 and 14 and in spaced relationship therewith. Spring 64 is positioned between a pair of spaced angle members 66 spanning the distance between the frame members 16 and 18. An internally threaded retainer 68 is rigidly secured to one end of spring 64 and receives in telescoping relationship thereto an externally threaded rod 70 which is secured to one end of a substantially flexible element or chain 72. The ohter end of chain 72 is fastened to the corresponding plate 24 by a clevis 74 received through an aperture 76 in plate 24. A sprocket wheel 78, mounted at one end of angle members 66 on upwardly extending brackets 80 for rotation about a shaft 82, is in meshed engagement with a chain 72 as illustrated best in FIG. 4 so that an upward pull on chain 72 by plate 24 extends spring 64 horizontally.

In like manner, a similar chain 84 is fastened by a clevis 74 to plate 22 and passes around a sprocket wheel 86 which is rotatably mounted at the other end of angle members 66 in identical fashion to the mounting sprocket wheel 78 heretofore described. One end of chain 84 is rigidly secured as by welding or the like to an internally threaded collar 88. The latter threadably receives the externally threaded surface of an elongated, adjusting rod 90 which is threadably telescoped into an internally threaded retainer 92 which is rigidly secured to the end of spring 64 opposite to the end carrying retainer 68. An irregular head 94 on rod 90 permits adjustment of the tension of spring 64 by a wrench or the like.

The novel mounting of support plates 22 and 24 to the respective frame members 16 and 18 through a four-point linkage permits movement of the upper roll 12 toward and away from the lower roll 14 along a substantially rectilinear path of travel without the necessity for relatively long arms. It will be apparent to those skilled in the art that the respective plates 22 and 24 float toward or away from the fixed axis of lower roll 14 as is required by the passage of quantities of crop material between the rolls. Manifestly, the frame members 16 and 18 are slotted as at 96 (FIG. 2) to accommodate the shifting movement of shaft 30 which is carried by plates 22 and 24 during such movement. At the same time, it should be noted that this substantially rectilinear path of travel is achieved without sacrificing the relatively low frictional characteristics obtained by the pivotal coupling of the mounting supports 22 and 24 to the frame members 16 and 18.

The utilization of a single spring 64 having its respective ends coupled to corresponding supports 22 and 24 insures that adequate biasing force is exerted on roll 12 toward roll 14 at all times irrespective of the fact that a relatively large bunch of hay or other material may pass between the rolls in proximal relationship to one end of the latter. Such large quantity of material has a tendency to force one end and its supporting plate of roll 12 further away from roll 14 than the other end and its corresponding supporting plate. However, the force exerted upon spring 64 by such extreme movement between the rolls at one end thereof is transmitted through spring 64 and its connecting chain to the opposite supporting plate for pulling the shiftable roll toward the stationary axis of the other roll to insure that proper conditioning force is applied to the material at all times. This conditioning force is maintained throughout, although irregularities in the feed are inevitable.

Spring 64 is preferably disposed substantially equi-distant between the ends of rolls 12 and 14 to further enhance the equalizing of the biasing forces which are exerted upon the shiftable roll 12. Further, it will be readily apparent that inequalities of the flow of material as heretofore described, will have a tendency to cause the axis of upper roll 12 to be moved out of parallelism with lower roll 14. Accordingly, the universal bearings 26 and 28 permits this misalignment of the axis of roll 12 with respect to support plates 22 and 24 without causing binding or the like.

A cover plate 98 (FIG. 5) may be provided in overlying relationship to spring 64 and the parallel angle members 66 to insure that foreign material does not interfere with proper operation of spring 64 to equalize the forces on roll 12 and also to permit ready adjustment of the tension on spring 64 as heretofore described.

Referring to FIG. 3, it will be seen that the novel arrangement including four-point suspension of plate 24 not only permits shifting of roll 12 toward and away from roll 14 along a substantially rectilinear path of travel for better controlling the crop conditioning forces exerted by the rolls, but also the movement of idler sprocket 54 follows a similar rectilinear path of travel. Accordingly, the shifting movement of sprocket 50 as roll 12 shifts under the influence of material passing between the rolls, causes corresponding shifting of idler sprocket 54 to maintain uniform tension in chain 48 at all times.

Having thus described the invention, what is claimed as new and desired to be secured by Letters Patent is:

1. In a crop conditioner having a pair of rotatable rolls, mounting means for one of said rolls comprising an assembly at each end respectively of the said one roll, each assembly including:
   structure having means rotatably supporting the one roll;
   a frame member; and
   a pair of swingable links pivotally interconnecting the frame member and said structure and disposed for substantially rectilinear movement of the one roll toward and away from the other roll.

2. The invention of claim 1,
   the axes of swinging movement of the links about their pivots on the frame member and the structure being parallel with the axis of rotation of the other of said rolls.

3. The invention of claim 2,
   said links converging as one of their ends is approached.

4. The invention of claim 3,
   the distance between the pivots of one link being the same as the distance between the pivots of the other link.

5. The invention of claim 4,
   the pivots of the links on the frame member being in a plane common with the axis of rotation of the one roll with said axis of the one roll being between the last-mentioned pivots.

6. The invention of claim 1,
   and a drive for said rolls including chain and sprocket wheel means operably coupled with the rolls, one of the sprocket wheels being an idler mounted for movement with the links of one of said assemblies.

7. The invention of claim 1, and means biasing said one roll toward said other roll including a spring extending longitudinally of the rolls in spaced relationship thereto, and means coupling the ends of the spring with the ends of said one roll whereby to maintain a substantially uniform, yieldable force on the one roll throughout its length as the spacing between the rolls varies therealong.

References Cited

UNITED STATES PATENTS

| | | | |
|---|---|---|---|
| 2,924,927 | 2/1960 | Pristo | 56—1 |
| 3,039,256 | 6/1962 | Witt | 56—1 |
| 3,116,582 | 1/1964 | Wathen et al. | 56—1 |
| 3,309,850 | 3/1967 | Glass et al. | 56—1 |

ANTONIO F. GUIDA, Primary Examiner